US012748800B2

(12) United States Patent
Miao et al.

(10) Patent No.: US 12,748,800 B2
(45) Date of Patent: Sep. 29, 2026

(54) LOW-RESOURCE, MULTI-LINGUAL TRANSFORMER MODELS

(71) Applicant: Microsoft Technology Licensing, LLC, Redmond, WA (US)

(72) Inventors: Li Miao, San Francisco, CA (US); Jian Wu, Bellevue, WA (US); Shuangyu Chang, Davis, CA (US); Piyush Behre, Santa Clara, CA (US); Sarangarajan Parthasarathy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 235 days.

(21) Appl. No.: 17/840,166

(22) Filed: Jun. 14, 2022

(65) Prior Publication Data

US 2023/0297606 A1 Sep. 21, 2023

Related U.S. Application Data

(60) Provisional application No. 63/321,430, filed on Mar. 18, 2022.

(51) Int. Cl.
*G06F 16/35* (2025.01)
*G06F 16/335* (2019.01)
(Continued)

(52) U.S. Cl.
CPC ............ *G06F 16/35* (2019.01); *G06F 16/335* (2019.01); *G06F 18/214* (2023.01);
(Continued)

(58) Field of Classification Search
CPC ...... G06F 16/35; G06F 16/335; G06F 18/214; G06F 18/23213; G06F 40/284;
(Continued)

(56) References Cited

U.S. PATENT DOCUMENTS 9,275,635 B1 * 3/2016 Beaufays ................ G10L 15/32
10,685,188 B1 * 6/2020 Zhang .................. G06F 40/263
(Continued)

OTHER PUBLICATIONS

Qian, Y., & Zhou, Z. (2022). Optimizing data usage for low-resource speech recognition. IEEE/ACM Transactions on Audio, Speech, and Language Processing, 30, 394-403. (Year: 2022).*
(Continued)

*Primary Examiner* — Richemond Dorvil
*Assistant Examiner* — Zeeshan Mahmood Shaikh
(74) *Attorney, Agent, or Firm* — Schwegman Lundberg & Woessner, P.A.

(57) ABSTRACT

Generally discussed herein are devices, systems, and methods for multi-lingual model generation. A method can include determining, for low-resource languages, respective a language similarity value indicating language similarity between each of the low-resource languages, clustering the low-resource languages into groups based on the respective language similarity value, aggregating training data of languages corresponding to a given group resulting in aggregated training data, and training a re-ranking language model based on the aggregated training data resulting in a trained re-ranking language model.

17 Claims, 6 Drawing Sheets

(51) Int. Cl.

| | |
|---|---|
| ***G06F 18/214*** | (2023.01) |
| ***G06F 18/23213*** | (2023.01) |
| ***G06F 40/284*** | (2020.01) |
| ***G06F 40/289*** | (2020.01) |
| ***G06N 3/04*** | (2023.01) |
| ***G06N 3/08*** | (2023.01) |

(52) U.S. Cl.
CPC ...... *G06F 18/23213* (2023.01); *G06F 40/284* (2020.01); *G06F 40/289* (2020.01); *G06N 3/04* (2013.01); *G06N 3/08* (2013.01)

(58) Field of Classification Search
CPC .......... G06F 40/289; G06N 3/04; G06N 3/08; G10L 15/183
See application file for complete search history.

(56) References Cited

U.S. PATENT DOCUMENTS 11,551,668 B1* 1/2023 Baevski .............. G06F 18/2155
11,868,381 B2* 1/2024 Müller .................. G06F 40/284
12,154,558 B1* 11/2024 Wang ...................... G10L 15/26
2012/0158621 A1* 6/2012 Bennett ................. G06F 16/334 706/12
2014/0309990 A1* 10/2014 Gandrabur .......... G10L 15/1815 704/9
2019/0034407 A1* 1/2019 Hagiwara ............. G06F 18/295
2023/0153542 A1* 5/2023 Niu .......................... G06F 40/45 704/8
2023/0186351 A1* 6/2023 Dhamija ............ G06Q 30/0276 705/14.72

OTHER PUBLICATIONS

Shaffer, K. (Nov. 2021). Language clustering for multilingual named entity recognition. In Findings of the Association for Computational Linguistics: EMNLP 2021 (pp. 40-45). (Year: 2021).*
"International Search Report and Written Opinion Issued in PCT Application No. PCT/US22/054213", Mailed Date: Apr. 11, 2023, 11 Pages.
Shaffer, Kyle, "Language Clustering for Multilingual Named Entity Recognition", In Findings of the Association for Computational Linguistics: EMNLP, Nov. 7, 2021, pp. 40-45.
Thomas, et al., "Multilingual Data Selection For Low Resource Speech Recognition", In Interspeech, Sep. 8, 2016, pp. 3853-3857.
Qian, et al., "Optimizing Data Usage for Low-Resource Speech Recognition", In IEEE/ACM Transactions on Audio, Speech, and Language Processing, vol. 30, Jan. 5, 2022, pp. 394-403.
Communication Pursuant to Article 94(3) Received for European Application No. 22856918.2, mailed on Nov. 13, 2025, 06 pages.
Communication under Rule 71(3) EPC Received for European Application No. 22856918.2, mailed on Jul. 20, 2026, 09 Pages.

* cited by examiner

200

| | BULGARIAN | SPANISH – CAT. | DANISH | GREEK | ENGLISH - GB | ENGLISH - USA | SPANISH - SPAIN | SPANISH – MEX. | ESTONIAN | FINNISH | FRENCH | GAELIC | CROATIAN | ITALIAN | LITHUANIAN | LATVIAN | MALTESE | NORWEGIAN | DUTCH |
|---|---|---|---|---|---|---|---|---|---|---|---|---|---|---|---|---|---|---|---|
| BULGARIAN | 1 | | | | | | | | | | | | | | | | | | |
| SPANISH – CAT. | 0 | 1 | | | | | | | | | | | | | | | | | |
| DANISH | 0 | .21 | 1 | | | | | | | | | | | | | | | | |
| GREEK | 0 | .11 | .1 | 1 | | | | | | | | | | | | | | | |
| ENGLISH - GB | 0 | .28 | .25 | .1 | 1 | | | | | | | | | | | | | | |
| ENGLISH - USA | 0 | .32 | .31 | .13 | .6 | 1 | | | | | | | | | | | | | |
| SPANISH - SPAIN | 0 | .37 | .18 | .09 | .3 | .36 | 1 | | | | | | | | | | | | |
| SPANISH – MEX. | 0 | .37 | .17 | .12 | .22 | .22 | .58 | 1 | | | | | | | | | | | |
| ESTONIAN | 0 | .18 | .18 | .18 | .2 | .17 | .17 | .14 | 1 | | | | | | | | | | |
| FINNISH | 0 | .17 | .16 | .08 | .16 | .23 | .13 | .15 | .18 | 1 | | | | | | | | | |
| FRENCH | 0 | .29 | .22 | .1 | .41 | .41 | .28 | .22 | .19 | .15 | 1 | | | | | | | | |
| GAELIC | 0 | .1 | .09 | .08 | .11 | .1 | .11 | .09 | .08 | .09 | .11 | 1 | | | | | | | |
| CROATIAN | 0 | .16 | .14 | .12 | .16 | .18 | .13 | .15 | .21 | .11 | .15 | .09 | 1 | | | | | | |
| ITALIAN | 0 | .3 | .2 | .1 | .31 | .35 | .3 | .25 | .19 | .15 | .3 | .1 | .15 | 1 | | | | | |
| LITHUANIAN | 0 | .12 | .11 | .11 | .12 | .13 | .1 | .12 | .21 | .09 | .11 | .08 | .14 | .11 | 1 | | | | |
| LATVIAN | 0 | .2 | .19 | .15 | .2 | .21 | .18 | .15 | .23 | .15 | .2 | .09 | .19 | .19 | .19 | 1 | | | |
| MALTESE | 0 | .18 | .17 | .13 | .18 | .18 | .17 | .14 | .14 | .15 | .18 | .09 | .15 | .2 | .12 | .17 | 1 | | |
| NORWEGIAN | 0 | .21 | .39 | .1 | .24 | .3 | .19 | .17 | .19 | .16 | .21 | .1 | .14 | .2 | .11 | .19 | .17 | 1 | |
| DUTCH | 0 | .23 | .23 | .1 | .3 | .36 | .21 | .18 | .19 | .14 | .26 | .1 | .13 | .23 | .11 | .19 | .17 | .22 | 1 |

FIG. 2

LOW-RESOURCE, MULTI-LINGUAL TRANSFORMER MODELS

CLAIM OF PRIORITY

The present patent application claims the priority benefit of the filing date of U.S. provisional application No. 63/321,430 filed Mar. 18, 2022, the entire content of which is incorporated herein by reference.

BACKGROUND

Speech recognition typically happens in two passes. A first pass acoustic model and language model generates top ranked n-best hypotheses from a global search space. For high-resource languages, the n-best hypotheses are re-ranked using a more powerful Neural Network Language Model (NNLM) in the second pass. It has been demonstrated that re-ranking using NNLM is effective at reducing WER (Word Error Rate). Currently, transformer language models produce state-of-the-art results in re-ranking.

Some automatic speech recognition (ASR) systems support 120+ locales, but re-ranking is only applied to a few (<15) high-resource locales. Some low-resource locales, like Slovenian, gain more benefits through re-ranking than some high-resource locales. Note that "locale" and "language" are used interchangeably herein.

Some challenges for low-resource locales include: (1) scarce training data for low-resource locales. The scarce training data limits the capacity to train the NNLM; (2) it is computationally expensive to train and regularly refresh 120+ monolingual re-ranking models, one for each locale; and (3) it is prohibitively expensive and inefficient to host these monolingual models in production, as traffic to the models can be sparse, but each model ends up consuming memory and compute resource for hosting across speech clusters Multi-lingual transformer language models (MLTLM) are a great general solution to support ASR with pretrained shareable components and data sources across multiple languages. When applied blindly however, MLTLMs may not always match or beat the monolingual models.

SUMMARY

A device, system, method, and computer-readable medium configured for multi-lingual language model generation are provided. The multi-lingual language model can overcome challenges in a general language model that operates on all languages and a mono-lingual language model that operates on a single language. The multi-lingual language model can have better accuracy for low-resource locales than the general language model and the mono-lingual language model. The multi-lingual language model is also more scalable and easier to maintain than the general language model and the mono-lingual language model A computer implemented method for multi-lingual language model generation can include determining, for low-resource languages, respective a language similarity value indicating language similarity between each of the low-resource languages. The method can include clustering the low-resource languages into groups based on the respective language similarity value. The method can include aggregating training data of languages corresponding to a given group resulting in aggregated training data. The method can include training a re-ranking language model based on the aggregated training data resulting in a trained re-ranking language model.

The method can include identifying an amount of language model training data is available for each language of a corpus of languages. The method can include identifying, based on the amount of language model training data, which languages of the corpus of languages are the low-resource languages. The language similarity value can be determined based on a number of words, phonemes, phrases, or learned language embeddings in both a first language of the low-resource languages and a second language of the low-resource languages. The clustering can include using k-means clustering, mini-batch k-means clustering, density-based spatial clustering of applications with noise (DBSCAN), a Gaussian mixture model, balanced iterative reducing and clustering using hierarchies (BIRCH), affinity propagation, ordering points to identify the clustering structure (OPTICS), mean-shift, agglomerative hierarchical clustering, divisive hierarchical clustering, or spectral clustering.

The method can include encoding the aggregated training data before training the re-ranking language model. Encoding the aggregated training data can include using byte pair encoding, a unigram language model, WordPiece, or SentencePiece. The method can include balancing the aggregated training data to include about a same amount of training data from each language in the given group. The re-ranking language model can include a neural network language model. The method can include executing the trained re-ranking language model resulting in re-ranked tokens, text formatting, or punctuation and capitalization.

BRIEF DESCRIPTION OF DRAWINGS

FIG. 2 illustrates, by way of example, an embodiment of a matrix of bi-lingual lexical similarity scores.

DETAILED DESCRIPTION

Figure 1:
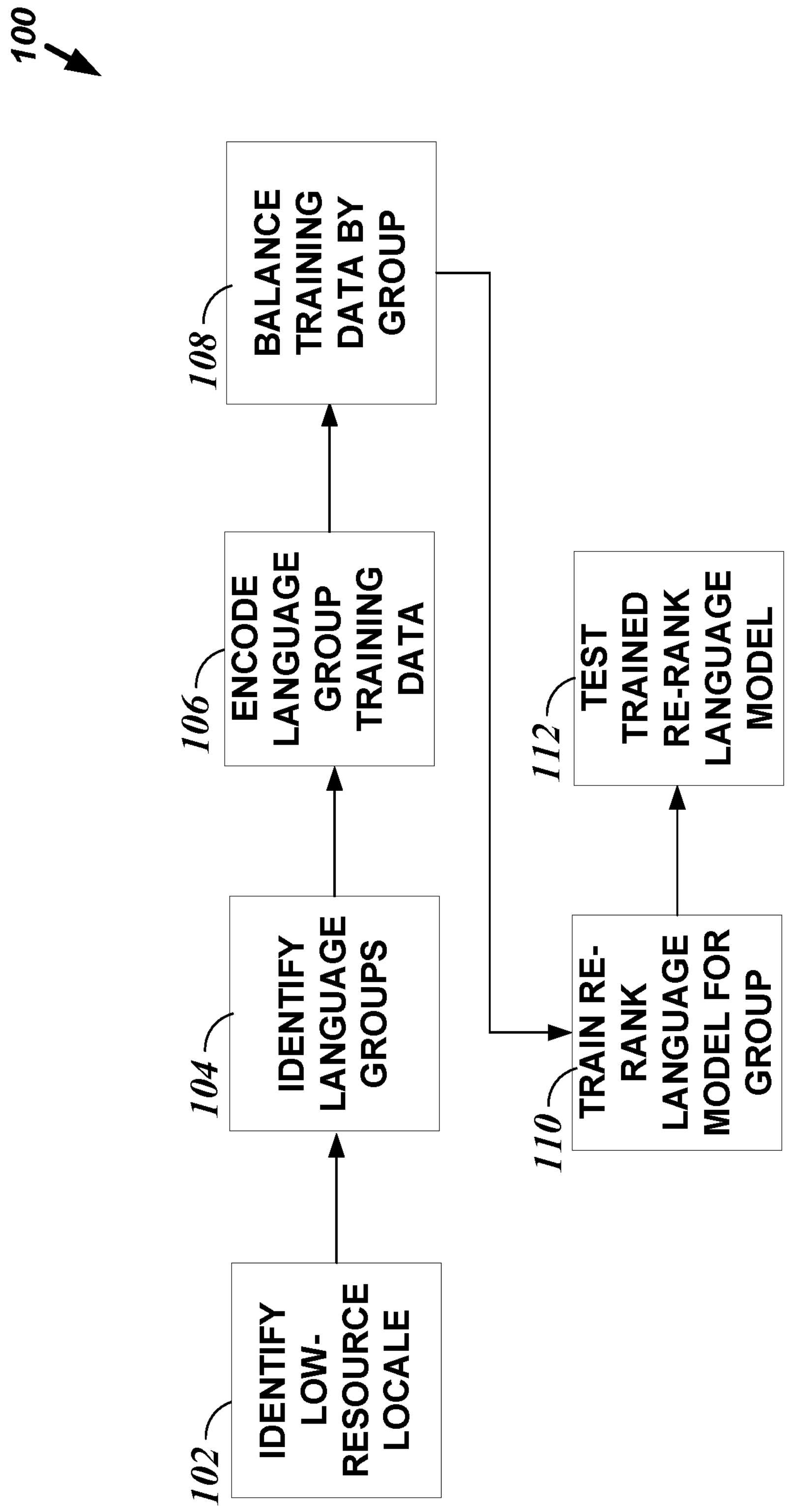
FIG. 1 illustrates, by way of example, a flow diagram of an embodiment of a method for generating low-resource multi-lingual language models.

Embodiments provide speech recognition model improvements for languages with more limited training data, called "low-resource locales" or "low-resource languages". Embodiments group training data from a corpus of low-resource locales that are similar. The grouping of the locales in the corpus of low-resource locales (sometimes called "low-resource languages") is performed in a manner that helps optimize performance of a model trained based on (e.g., trained based on only) the aggregated training of all the low-resource locales in a given group. A language model (e.g., a MLTLM) trained in accord with embodiments can outperform a general multi-lingual model (MLM) as well as a monolingual LM for a given locale of the locales. A general MLM is a model trained on data from all available languages and a monolingual model is trained on only data in a single language.

Embodiments overcome one or more challenges indicated in the Background. Low-resource (scarce data) locales can benefit from all the data available for their locale group. Speech clusters can thus be used to train and maintain only a few locale-group models and still can attain locale coverage of 120+ locales for re-ranking. Thus, fewer overall second pass LMs can be retained resulting in hosting and scaling efficiencies across clusters.

Grouping low-resource locales from the corpus low-resource locales works in other domains. For instance, grouping low-resource locales works in text formatting for improving capitalization and punctuation for the recognition output. Other applications are anticipated by the inventors.

Existing approaches to SR for low-resource locales either target monolingual or general MLTLMs. Mono-lingual model training requires sufficient data, which is very hard to collect in many low-resource locales. Embodiments help overcome this issue by clustering similar locales and aggregating training data for locales in a same cluster. The aggregation of training data increases the amount of training for the locales. Mono-lingual models require independent host, refresh, and maintenance, which is expansive and not sustainable at scale (e.g., 120 or more locales). Embodiments help overcome this by providing a single re-ranking model that operates on multiple locales. The multiple locales are a subset of all the locales in the set. Also, the multiple locales have below a specified threshold amount of training data (e.g., input-output examples or the like) or in a ranking or locales by amount of training data, have a rank below a specified rank.

Compared to mono-lingual models, general MLMs require a lot more parameters to work properly for all locales and have a larger memory footprint and serving latencies. This makes General MLMs unattractive and often time impractical for deployment as a product. Embodiments reduce the parameters of the general MLMs by generating clusters of multiple locales and training an individual re-ranking LM for locales in each cluster. This provides re-ranking LMs with parameters that is greatly reduced as compared to the general MLM. General MLMs often regress in speech recognition quality for certain locales compared with mono-lingual models. This can be, at least in part, because the general MLM is unable to implicitly make use of data available from other similar locales of the same locale group. Embodiments help overcome this issue by grouping locales by language similarity and training a single model on all similar locales in the same group. Groups can overlap or be disjointed. Overlapping groups mean that a locale in one group can be a member of another group. Disjointed groups mean that each locale is only in a single group. The language similarity of the locales allows the model to implicitly learn how to re-rank n-best hypotheses of a first locale based on data from N similar languages, where N is the number of locales in the group of which the first local is a member. Embodiments provide language group identification on large scale transformer language models for speech recognition, text formatting, capitalization, punctuation, other application, or a combination thereof.

Embodiments can perform two or more operations. A first operation can include identifying a language group of the low-resource locale using a data-driven method. The second operation can include encoding training data of a low-resource locale group. The encoding can be performed using sharable byte pair encoding (BPE) tokens, a unigram language model, WordPiece, or SentencePiece, among others. WordPiece is a subword segmentation algorithm used in natural language processing. A vocabulary is initialized with individual characters in the language, then the most frequent combinations of symbols in the vocabulary are iteratively added to the vocabulary. SentencePiece is a language-independent subword tokenizer and detokenizer designed for neural-based text processing, including neural machine translation.

The re-rank model can be trained based on the encoded data of a group. Whenever there is a lack of training resources or hardware to support individual model development and deployment, one can choose to deploy the group-based multilingual LM, which provides significant speech recognition accuracy improvement and maintenance and cost reduction.

FIG. 1 illustrates, by way of example, a flow diagram of an embodiment of a method 100 for generating low-resource multi-lingual language models. The method 100 as illustrated includes identifying low-resource locales, at operation 102; identifying language groups, at operation 104; encoding language group training data, at operation 106; balancing training data by group, at operation 108; training a re-rank LM for each group, at operation 110; and testing the trained re-rank LM, at operation 112.

The operation 102 can include determining which locales do not have sufficient training data, called a "low-resource locale". The operation 102 can include determining how much training data is available for each locale. The operation 102 can include comparing the amount of training data available for each locale to a specified threshold training data value. The specified threshold training data value can be set by a subject matter expert (SME), for example, the specified threshold training data value can be the value at about which there is sufficient training data for training an accurate mono-lingual model for the locale. Any locale with an amount of training data less than the specified threshold training data value can be considered a low-resource locale. Additionally, or alternatively, the amount of training data available can be ranked (e.g., from most to least or vice versa). Each locale above or below a specified rank (e.g., 5, 10, 15, a greater or lesser rank or some rank therebetween) can be considered a low-resource locale. In some embodiments, a low-resource locale has both (i) an amount of training data below the specified threshold training data value and a rank that is above or below the specified rank.

At operation 104, the low-resource locales identified at operation 102 can be grouped. The operation 104 can include determining a language similarity between a given low-resource locale and each other low-resource locales. Language similarity can be determined in a number of ways. One way of determining language similarity can include determining a bi-lingual lexical similarity score vector for each low-resource locale. The lexical similarity score vector can include an entry for each low-resource locale. The lexical similarity score can be a measure of the number of phonemes, words, phrases, or learned language embeddings, or the like that are in both locales. For example, consider the low-resource locale, Slovak and the example low-resource similarity vector: {similarity 0, similarity 1, similarity 2, similarity 3, similarity 4, similarity 5, similarity 6, similarity 7}. The entries in the lexical similarity vector can indicate how lexically similar Slovak is to English, Irish, Estonian, Croatian, Slovenian, Slovak, Lithuanian, Catalunya, respectively. A higher similarity score can indicate more language similarity. The similarity score can be generated for each low-resource locale and can indicate the similarity of a given locale to all other low-resource locales. The language similarity value can be trained by training language embeddings, which can be achieved by pre-trained or joint-trained multilingual language models/acoustic models/end-to-end speech recognition models.

FIG. 2 illustrates, by way of example, an embodiment of a matrix 200 of bi-lingual lexical similarity scores. A bi-lingual lexical similarity score is an example of a language similarity value. The matrix 200 is essentially a concatenated and simplified combination of lexical similarity vectors. An example bi-lingual lexical similarity score based on word overlap ("lexical overlap") can be computed according to an average of word overlap ratios in accord with Equation 1:

$$\text{Lexical Similarity} = \frac{\frac{\#\text{ Overlapped Words}}{\#\text{ Words in Locale } A} + \frac{\#\text{ Overlapped Words}}{\#\text{ Words in Locale } B}}{2} \quad \text{Equation 1}$$

Note that phonemes, phrases, or the like can be substituted for "Words" in Equation 1.

At operation 104, the language similarity values for the low-resource locales can be input to a clustering technique. The clustering technique can cluster the low-resource locales into groups by grouping the corresponding language similarity values. The language similarity values can be grouped by distance, entry similarity, or the like. Example language similarity values clustering techniques can include k-means clustering, mean-shift clustering, expectation-maximization clustering using Gaussian mixture models (GMMs), agglomerative hierarchical clustering, mini-batch k-means clustering, density-based spatial clustering of applications with noise (DBSCAN), a different technique using a Gaussian mixture model, balanced iterative reducing and clustering using hierarchies (BIRCH), affinity propagation, ordering points to identify the clustering structure (OPTICS), mean-shift, divisive hierarchical clustering, or spectral clustering, among others. These are all well-known clustering techniques. Clustering based on the language similarity value in the manner described successfully identifies known language families, such as Balto-Slavic, which includes low-resource locales Slovenian, Croatian, Slovak, and Czech.

The operation 106 can include encoding the training and testing data of the low-resource locales by group. Many different types of encoding can be performed at operation 106. One example encoding is BPE. BPE is sometimes called diagram code. BPE is a form of data compression in which most common pairs of consecutive tokens of data are replaced with a token that does not occur within the data. A table of replacements is typically used to rebuild the original data from the encoding. Encoding with BPE across groups of languages improves the token coverage or limited token set size and standardizes sub-word units across languages that share a same alphabet. For example, with 250,000 BPE tokens, one can cover ~100% of 350,000,000 unique words across twenty-six languages.

In BPE, words that include sub-words can be broke apart and a token can be provided to indicate that the word was broken apart into sub-words. Examples of such words in a variety of locales are provided in Table 1.

TABLE 1

Examples of text in BPE format

| Locale | Original Sentence | 250k BPE Tokens |
|---|---|---|
| English (en-US) | ask consternation to my word list | ask conster@@ nation to my word list |
| Irish (ga-IE) | a naoi scoil nach bhfuil seomra acmhainne acu | a naoi scoil nach bhfuil seomra acmha@@ inne acu |
| Estonia (et-EE) | asukoha nimed on sofia ja bulgaaria | asukoha ni@@ med on sofia ja bulgaaria |

Other example encodings that can be used in place of BPE include a unigram language model, WordPiece, or SentencePiece, among others.

At operation 108, the training data can be culled to balance an amount of training data available, such that each locale in a low-resource locale group has about an equal representation (e.g., about a same amount, such as within a specified percentage (e.g., 1%, 2%, 3%, 4%, 5%, 10%, 15%, 20%, 25%, or a percentage therebetween) of amount of training data for a locale) of training data, testing data, or a combination thereof. The balanced data can be used to train the locale-group LM. To ensure balanced data coverage for multiple locales within the same group, sentences can, for example, be sampled with multinomially distributed probabilities $q_i$ in accord with Equation 2:

$$q_i = \frac{p_i^\alpha}{\sum_{j=1}^{N} p_j^\alpha} \text{ where } p_i = \frac{n_i}{\sum_{k=1}^{N} n_k} \quad \text{Equation 2}$$

The operation 110 can be performed using the balanced data that is generated as a result of the operation 108. Using the balanced locale group data family, the locale-group LM can be trained as shown in FIG. 3.

Figure 3:
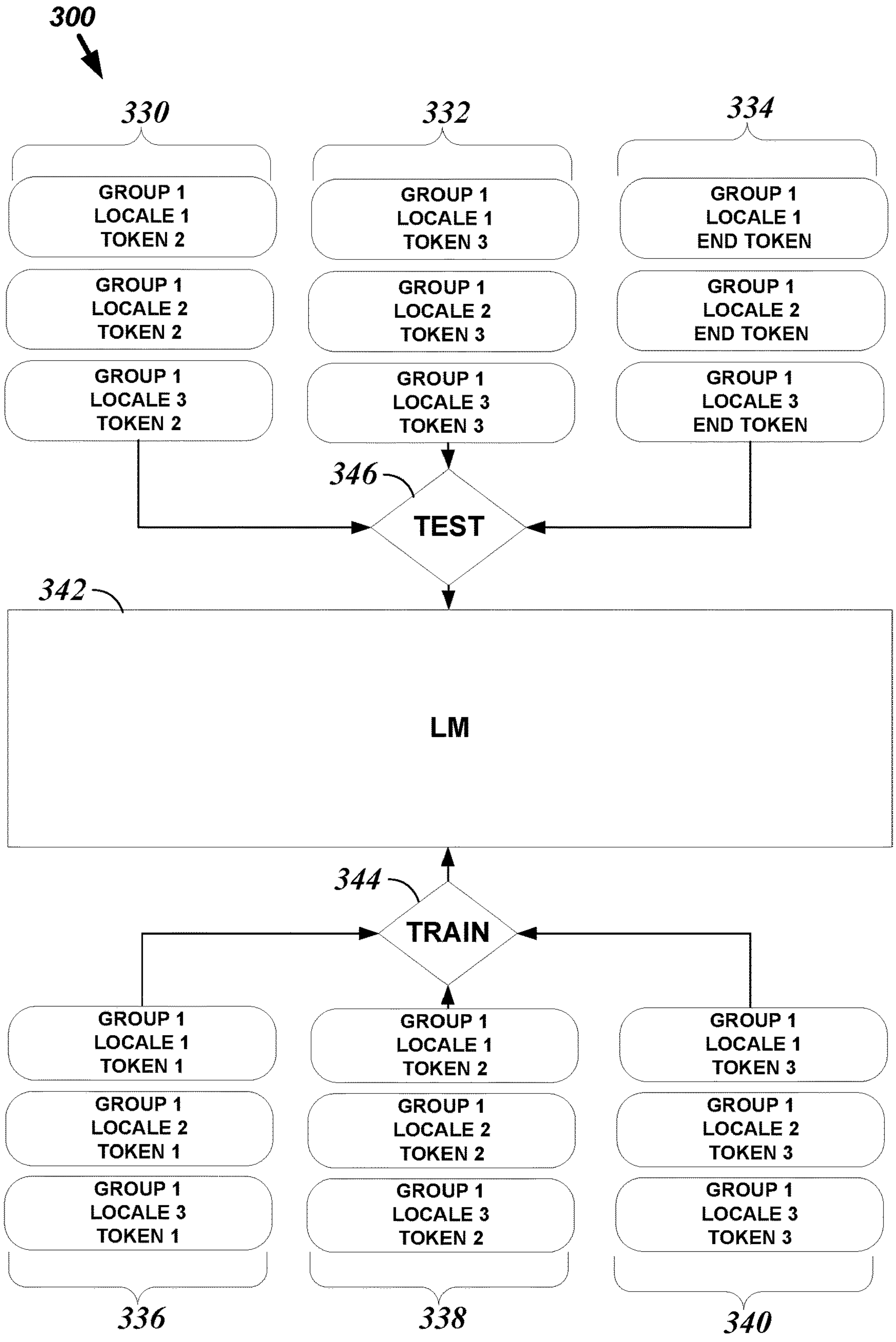
FIG. 3 illustrates, by way of example, a diagram of an embodiment of method for batch training and testing using balanced local group data.

FIG. 3 illustrates, by way of example, a diagram of an embodiment of method 300 for batch training and testing using balanced local group data. The method 300 includes generating batches 336, 338, 340 of data. Each of the batches 336, 338, 340 includes data from each locale in the corresponding group serviced by an LM 342. The data in each of the batches can correspond to a given token in each of the locales in the group. The batched data can be input 344 into the LM 342 for training, such as in a supervised manner. By batching data in this manner, nuances in each of the languages can be learned by the LM 342.

During test 346, balanced test data can be batched in a similar manner. The method 300 as illustrated includes batches 330, 332, 334 of balanced test data provided to the LM 342. Each of the batches 330, 332, 334 includes data from each locale in the corresponding group serviced by the LM 342. The data in each of the batches 330, 332, 334 can correspond to a given token in each of the locales in the group. The batched data can be input 344 into the LM 342 for testing. The valid loss and perplexity of individual locales, and of the language family can be recorded. According to tests, the average loss minimum is within the range of the loss minimum of the individual locale, which indicates that the locale-group LM 342 converges to all locales within the identified language group.

The LM 342 can be a re-ranking machine learning model. In some embodiments the LM can include a neural network (NN) LM (NNLM). A single-layer long short-term memory (LSTM) network is an example of an NNLM that can be used for re-ranking.

The accuracy of models generated in several resource-poor regions was determined and the results are provided. Compared to a current mono-lingual LSTM baseline, the LMs in accord with embodiments provide an average improvement of about 3.84% word error rate reduction (WERR) (e.g., 11.90%→15.74%). Compared to a general multi-lingual transformer model, LMs in accord with embodiments provide an average improvement of about 2.57% WERR (e.g., 13.17%→15.74%).

TABLE 2

WERR Gains from LMs in accord with embodiments

| Language | Baseline Mono-lingual LSTM WERR | General Multi-lingual Transformer LM WERR | In Accord with Embodiments, Multi-lingual Transformer LM WERR |
|---|---|---|---|
| Croatian (hr-HR) | 12.15 | 13.83 | 16.81 |
| Slovenian (sl-SI) | 12.13 | 13.06 | 15.81 |
| Slovak (sk-SK) | 13.21 | 15.08 | 17.14 |
| Lithuanian (lt-LT) | 10.12 | 10.74 | 13.21 |
| AVERAGE | 11.90 | 13.17 | 15.74 |

Embodiments provide a solid foundation to improve low-resource locales' Speech Recognition quality in other related domains, such as multi-lingual capitalization and punctuation models for recognition display text formatting. In the case of locales that can be supported with adequate resources, embodiments can also support an option of masked fine-tuning based on a pre-trained locale-group multi-lingual language model to create a final locale dedicated LM. Better WERR can be realized by finetuning based on a locale-group multi-lingual model in accord with embodiments.

A Neural Network Language Model (NNLM) can be an important module in a hybrid ASR system to deliver an optimal recognition accuracy. Embodiments propose a general and scalable approach to train and deploy a large-scale locale-group transformer NNLM (or other ML model), such as to support ASR in low-resource languages, where significant accuracy improvement and reduction in model development and maintenance is realized.

Figure 4:
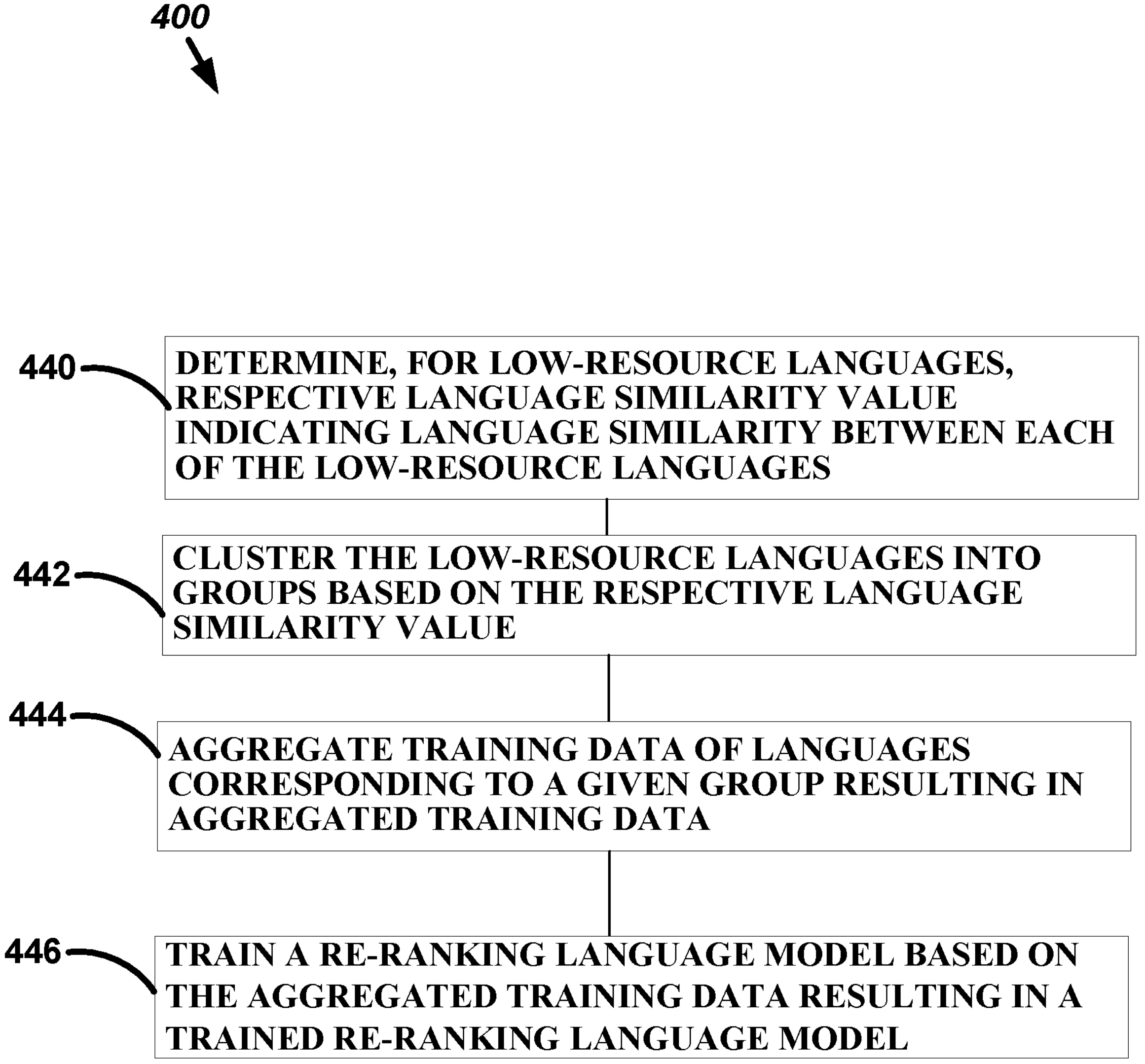
FIG. 4 illustrates, by way of example, a diagram of an embodiment of a method for multi-lingual model generation.

FIG. 4 illustrates, by way of example, a diagram of an embodiment of a method 400 for multi-lingual model generation. The method 400 as illustrated includes determining, for low-resource languages, respective a language similarity value indicating language similarity between each of the low-resource languages, at operation 440; clustering the low-resource languages into groups based on the respective language similarity value, at operation 442; aggregating training data of languages corresponding to a given group resulting in aggregated training data, at operation 444; and training a re-ranking language model based on the aggregated training data resulting in a trained re-ranking language model, at operation 446.

The method 400 can further include identifying an amount of language model training data is available for each language of a corpus of languages. The method 400 can further include identifying, based on the amount of language model training data, which languages of the corpus of languages are the low-resource languages. The method 400 can further include, wherein the language similarity value is determined based on a number of words, phonemes, or phrases in both a first language of the low-resource languages and a second language of the low-resource languages.

The method 400 can further include, wherein clustering the languages includes using k-means clustering, mini-batch k-means clustering, density-based spatial clustering of applications with noise (DBSCAN), a Gaussian mixture model, balanced iterative reducing and clustering using hierarchies (BIRCH), affinity propagation, ordering points to identify the clustering structure (OPTICS), mean-shift, agglomerative hierarchical clustering, divisive hierarchical clustering, or spectral clustering. The method 400 can further include encoding the aggregated training data before training the re-ranking language model. The method 400 can further include, wherein encoding the aggregated training data includes using byte pair encoding, a unigram language model, WordPiece, or SentencePiece.

The method 400 can further include balancing the aggregated training data to include about a same amount of training data from each language in the given group. The method 400 can further include, wherein the re-ranking language model is a neural network language model. The method 400 can further include executing the trained re-ranking language model resulting in re-ranked tokens, text formatting, or punctuation and capitalization.

Artificial Intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications, such as text prediction, toxicity classification, content filtering, or the like. The LM 342 can include one or more NNs.

Many NNs are represented as matrices of weights (sometimes called parameters) that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The optimal operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights.

In some examples, initial weights may be randomly selected. Training data is fed into the NN, and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 5:
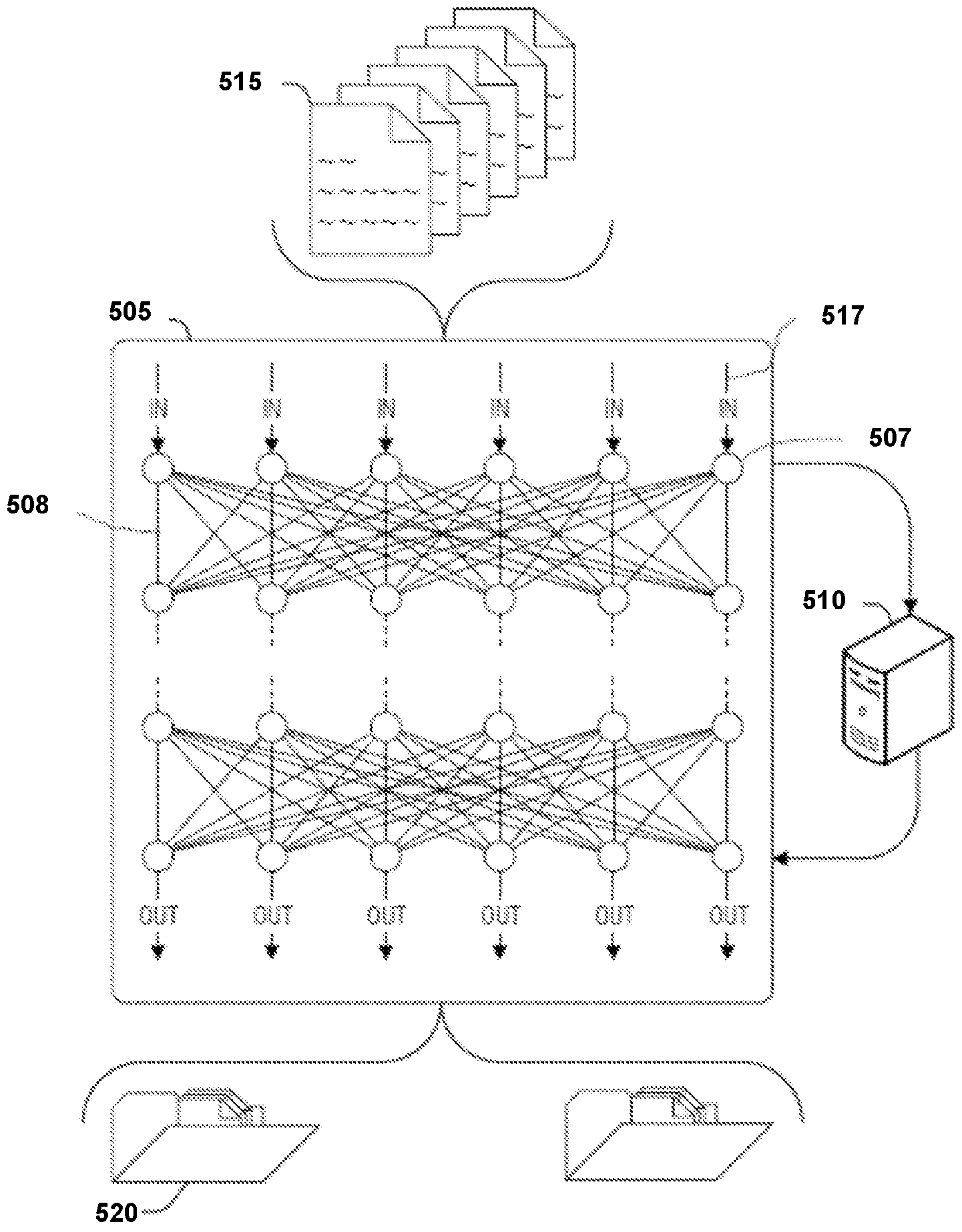
FIG. 5 is a block diagram of an example of an environment including a system for neural network training.

FIG. 5 is a block diagram of an example of an environment including a system for neural network training. The system includes an artificial NN (ANN) 505 that is trained using a processing node 510. The processing node 510 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 505, or even different nodes 507 within layers. Thus, a set of processing nodes 510 is arranged to perform the training of the ANN 505.

The set of processing nodes 510 is arranged to receive a training set 515 for the ANN 505. The ANN 505 comprises a set of nodes 507 arranged in layers (illustrated as rows of nodes 507) and a set of inter-node weights 508 (e.g., parameters) between nodes in the set of nodes. In an example, the training set 515 is a subset of a complete training set. Here, the subset may enable processing nodes with limited storage resources to participate in training the ANN 505.

The training data may include multiple numerical values representative of a domain, such as a word, symbol, number, other part of speech, or the like. Each value of the training or input 517 to be classified after ANN 505 is trained, is provided to a corresponding node 507 in the first layer or input layer of ANN 505. The values propagate through the layers and are changed by the objective function.

As noted, the set of processing nodes is arranged to train the neural network to create a trained neural network. After the ANN is trained, data input into the ANN will produce valid classifications 520 (e.g., the input data 517 will be assigned into categories), for example. The training performed by the set of processing nodes 507 is iterative. In an example, each iteration of the training the ANN 505 is performed independently between layers of the ANN 505. Thus, two distinct layers may be processed in parallel by different members of the set of processing nodes. In an example, different layers of the ANN 505 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 507 (e.g., neurons) are trained independently. In an example, the nodes are trained on different hardware.

Figure 6:
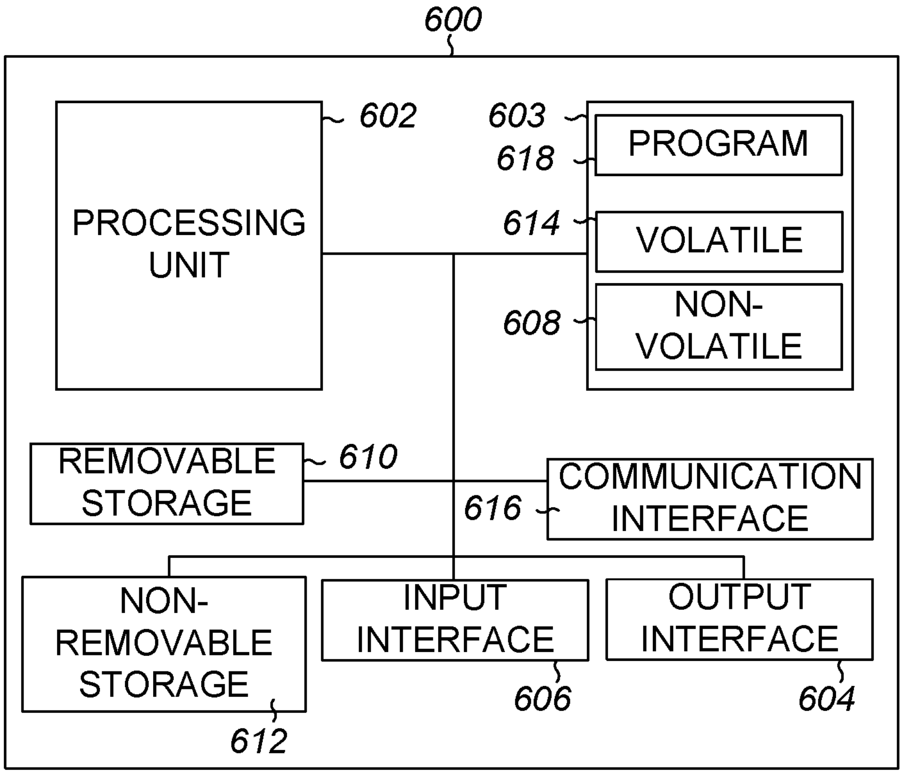
FIG. 6 illustrates, by way of example, a block diagram of an embodiment of a machine (e.g., a computer system) to implement one or more embodiments.

FIG. 6 illustrates, by way of example, a block diagram of an embodiment of a machine 600 (e.g., a computer system) to implement one or more embodiments. The LM 342 or a component thereof can include one or more of the components of the machine 600. One or more of the method 100 or LM 342, or a component or operations thereof can be implemented, at least in part, using a component of the machine 600. One example machine 600 (in the form of a computer), may include a processing unit 602, memory 603, removable storage 610, and non-removable storage 612. Although the example computing device is illustrated and described as machine 600, the computing device may be in different forms in different embodiments. For example, the computing device may instead be a smartphone, a tablet, smartwatch, or other computing device including the same or similar elements as illustrated and described regarding FIG. 6. Devices such as smartphones, tablets, and smartwatches are generally collectively referred to as mobile devices. Further, although the various data storage elements are illustrated as part of the machine 600, the storage may also or alternatively include cloud-based storage accessible via a network, such as the Internet.

Memory 603 may include volatile memory 614 and non-volatile memory 608. The machine 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 600 may include or have access to a computing environment that includes input 606, output 604, and a communication connection 616. Output 604 may include a display device, such as a touchscreen, that also may serve as an input device. The input 606 may include one or more of a touchscreen, touchpad, mouse, keyboard, camera, one or more device-specific buttons, one or more sensors integrated within or coupled via wired or wireless data connections to the machine 600, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 602 (sometimes called processing circuitry) of the machine 600. A hard drive, CD-ROM, and RAM are some examples of articles including a non-transitory computer-readable medium such as a storage device. For example, a computer program 618 may be used to cause processing unit 602 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on processing circuitry, such as can include a digital signal processor, ASIC, microprocessor, central processing unit (CPU), graphics processing unit (GPU), field programmable gate array (FPGA), or other type of processor operating on a computer system, such as a personal computer, server, or other computer system, turning such computer system into a specifically programmed machine. The processing circuitry can, additionally or alternatively, include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like). The terms computer-readable medium, machine readable medium, and storage device do not include carrier waves or signals to the extent carrier waves and signals are deemed too transitory.

ADDITIONAL NOTES AND EXAMPLES

Example 1 includes a computer implemented method for multi-lingual language model generation including determining, for low-resource languages, respective a language similarity value indicating language similarity between each of the low-resource languages, clustering the low-resource languages into groups based on the respective language similarity value, aggregating training data of languages corresponding to a given group resulting in aggregated training data, and training a re-ranking language model based on the aggregated training data resulting in a trained re-ranking language model.

In Example 2, Example 1 includes identifying an amount of language model training data is available for each language of a corpus of languages, and identifying, based on the amount of language model training data, which languages of the corpus of languages are the low-resource languages.

In Example 3, at least one of Examples 1-2 includes, wherein the language similarity value is determined based on a number of words, phonemes, or phrases in both a first language of the low-resource languages and a second language of the low-resource languages.

In Example 4, at least one of Examples 1-3 includes, wherein clustering the languages includes using k-means clustering, mini-batch k-means clustering, density-based spatial clustering of applications with noise (DBSCAN), a Gaussian mixture model, balanced iterative reducing and clustering using hierarchies (BIRCH), affinity propagation, ordering points to identify the clustering structure (OPTICS), mean-shift, agglomerative hierarchical clustering, divisive hierarchical clustering, or spectral clustering.

In Example 5, at least one of Examples 1-4 includes encoding the aggregated training data before training the re-ranking language model.

In Example 6, Example 5 includes, wherein encoding the aggregated training data includes using byte pair encoding, a unigram language model, WordPiece, or SentencePiece.

In Example 7, at least one of Examples 1-6 includes balancing the aggregated training data to include about a same amount of training data from each language in the given group.

In Example 8, at least one of Examples 1-7 includes, wherein the re-ranking language model is a neural network language model.

In Example 9, at least one of Examples 1-8 includes executing the trained re-ranking language model resulting in re-ranked tokens, text formatting, or punctuation and capitalization.

Example 10 includes a compute system comprising a memory, processing circuitry coupled to the memory, the processing circuitry configured to perform the operations of the method of at least one of Examples 1-0.

Example 11 includes a machine-readable medium including instructions that, when executed by a machine, cause the machine to perform operations of the method of at least one of Examples 1-9.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A computer implemented method for multi-lingual language model generation, the method comprising:

identifying an available amount of language model training data for each language of a corpus of languages; and identifying, based on the available amount of language model training data, which languages of the corpus of languages are low-resource languages;

determining, for the low-resource languages, respective language similarity values, the respective language similarity values indicating language similarity between pairs of different low-resource languages of the low-resource languages;

clustering, using the respective language similarity values as input, the low-resource languages into groups;

aggregating training data of languages corresponding to a given group of the groups resulting in aggregated training data; and training a re-ranking language model based on the aggregated training data resulting in a trained re-ranking language model that operates to re-rank outputs from a separate speech recognition model.

2. The method of claim 1, wherein the language similarity value is determined based on a number of words, phonemes, phrases, or learned language embeddings in both a first language of the low-resource languages and a second language of the low-resource languages.

3. The method of claim 1, wherein clustering the languages includes using k-means clustering, mini-batch k-means clustering, density-based spatial clustering of applications with noise (DBSCAN), a Gaussian mixture model, balanced iterative reducing and clustering using hierarchies (BIRCH), affinity propagation, ordering points to identify clustering structure (OPTICS), mean-shift, agglomerative hierarchical clustering, divisive hierarchical clustering, or spectral clustering.

4. The method of claim 1, further comprising encoding the aggregated training data before training the re-ranking language model.

5. The method of claim 4, wherein encoding the aggregated training data includes using byte pair encoding, a unigram language model, WordPiece, or SentencePiece.

6. The method of claim 1, further comprising balancing the aggregated training data to include about a same amount of training data from each language in the given group.

7. The method of claim 1, wherein the re-ranking language model is a neural network language model.

8. The method of claim 1, further comprising executing the trained re-ranking language model resulting in re-ranked tokens, text formatting, or punctuation and capitalization.

9. A system comprising:

processing circuitry; and a memory including instructions that, when executed by the processing circuitry, cause the processing circuitry to perform operations for multi-lingual language model generation, the operations comprising:

identifying an available amount of language model training data for each language of a corpus of languages; and identifying, based on the available amount of language model training data, which languages of the corpus of languages are low-resource languages;

determining, for the low-resource languages, respective language similarity values, the respective language similarity values indicating language similarity between pairs of different low-resource languages of the low-resource languages;

clustering, using the respective language similarity values as input, the low-resource languages into groups;

aggregating training data of languages corresponding to a given group of the groups resulting in aggregated training data; and training a re-ranking language model based on the aggregated training data resulting in a trained re-ranking language model that operates to re-rank outputs from a separate speech recognition model.

10. The system of claim 9, wherein the language similarity value is determined based on a number of words, phonemes, phrases, or learned language embeddings in both a first language of the low-resource languages and a second language of the low-resource languages.

11. The system of claim 9, wherein clustering the languages includes using k-means clustering, mini-batch k-means clustering, density-based spatial clustering of applications with noise (DBSCAN), a Gaussian mixture model, balanced iterative reducing and clustering using hierarchies (BIRCH), affinity propagation, ordering points to identify clustering structure (OPTICS), mean-shift, agglomerative hierarchical clustering, divisive hierarchical clustering, or spectral clustering.

12. The system of claim 9, further comprising encoding the aggregated training data before training the re-ranking language model.

13. The system of claim 12, wherein encoding the aggregated training data includes using byte pair encoding, a unigram language model, WordPiece, or SentencePiece.

14. The system of claim 9, further comprising balancing the aggregated training data to include about a same amount of training data from each language in the given group.

15. The system of claim 9, wherein the re-ranking language model is a neural network language model.

16. The system of claim 9, further comprising executing the trained re-ranking language model resulting in re-ranked tokens, text formatting, or punctuation and capitalization.

17. A machine-readable medium including instructions that, when executed by a machine, cause the machine to perform operations for multi-lingual language model generation, the operations comprising:

identifying an available amount of language model training data for each language of a corpus of languages; and identifying, based on the available amount of language model training data, which languages of the corpus of languages are low-resource languages;

determining, for the low-resource languages, respective language similarity values, the respective language similarity values indicating language similarity between pairs of different low-resource languages of the low-resource languages;

clustering, using the respective language similarity values as input, the low-resource languages into groups;

aggregating training data of languages corresponding to a given group of the groups resulting in aggregated training data; and training a re-ranking language model based on the aggregated training data resulting in a trained re-ranking language model that operates to re-rank outputs from a separate speech recognition model.

* * * * *